//united States Patent Office 3,480,532
Patented Nov. 25, 1969

3,480,532
PHOTOCHEMICAL PROCESS FOR
PRODUCING ADDUCTS
Derek Bryce-Smith, Andrew Gilbert, and Brian Vickery,
Reading, England
No Drawing. Continuation-in-part of application Ser. No.
328,505, Dec. 6, 1963. This application Dec. 23, 1964,
Ser. No. 420,785
Int. Cl. C07c 51/54; C07b 29/00
U.S. Cl. 204—158                                    13 Claims

ABSTRACT OF THE DISCLOSURE

A process for producing a tricyclic tetracarboxylic dianhydride which can be substituted in the 7 and 8 positions which comprises exposing to radiant energy of wavelengths from 2700 to 4000 angstrom units a solution of substituted benzene, maleic anhydride and an aromatic carbonyl photosensitizer and subsequently separating the dianhydride from the mixture. The dianhydrides produced are useful in forming polyimides and as cross-linking agents.

---

This is a continuation in part of U.S. patent application Ser. No. 328,505, filed Dec. 6, 1963, now abandoned.

This invention relates to a process for producing a tricyclic tetracarboxylic dianhydride which is an adduct of maleic anhydride and benzene or substituted benzene.

Tricyclic tetracarboxylic dianhydrides which are adducts of maleic anhydride and benzene have been produced by irradiating a mixture of the components with a mercury arc in the presence of a photosensitizer such as benzophenone. Also produced in this mercury arc process is a polymer of the dianhydride which adheres strongly to the surfaces of the reaction vessel and thereby decreases transmission of the mercury arc radiation to the solution. Production of this polymer decreases reaction yield (to less than 80–90%) and reaction efficiency and its presence in the mixture seriously complicates separation of the also insoluble dianhydride. The radiant energy produced by mercury arcs generally as wavelengths of less than 2200 up to about 3800 angstrom units with high energy peaks at 2537 and 2652 angstrom units.

In accordance with this invention there is prepared a tricyclic tetracarboxylic dianhydride having the structural formula

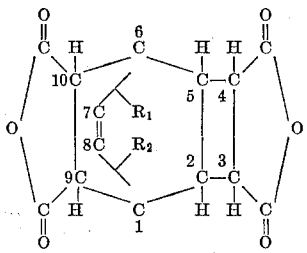

in which $R_1$ and $R_2$ are attached to different carbon atoms in the group numbered 1, 8, 7, 6; $R_1$ is hydrogen, chloro, fluoro, dimethylamino, diethylamino, methylethylamine, alkyl, alkoxy, or hydroxyl; $R_2$ is hydrogen, chloro, fluoro, phenyl, alkyl, alkoxy or hydroxyl, $R_2$ being hydroxyl when $R_1$ is hydroxyl; $R_2$ is attached to one of the carbon atoms numbered 7 and 8 when $R_1$ is hydrogen, or to one of the four carbon atoms numbered 1, 8, 7, 6 when $R_1$ is other than hydrogen, with the remaining unsatisfied valences of the carbons numbered 1, 8, 7, 6 being satisfied by hydrogen. This dianhydride is prepared by exposing to radiant energy consisting essentially of wavelengths of about 2700 to 4000 angstrom units, a solution of (A) a compound having the structural formmula

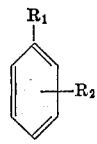

in which $R_1$ and $R_2$ are the same as $R_1$ and $R_2$ in the dianhydride structural formula above, (B) maleic anhydride, and (C) a photosensitizer consisting essentially of an aromatic compound having a carbonyl group attached, and separating the resulting dianhydride from the reaction product mixture.

This process produces a pure dianhydride at yields as high as about 93% and does not produce a polymer or other material which would interfere with separation of the dianhydride from other components in the system.

Radiant energy useful in the process of this invention can have wavelengths longer than 4000 angstrom units but no benefit is gained from these longer wavelengths. Sunlight is one source of radiant energy useful in the process of this invention. Most of the radiant energy of sunlight has wavelengths of above about 2700 angstrom units to well over 7800 angstrom units. Use of a filter to remove radiant energy having wavelengths shorter than 2700 angstrom units from sunlight increases the efficiency of the process of this invention. Filter materials capable of removing these shorter wavelengths and which are insoluble in the compounds used in this invention, such as borosilicate glass, polyethylene, polytetrafluoroethylene, and polyvinylfluoride, are especially useful as reaction vessel construction materials since these materials then serve a double purpose.

Radiant energy for the process of this invention can also be supplied by filtering wavelengths shorter than about 2700 angstrom units from the radiation produced by a mercury arc. The filtering materials described above are also useful for filtering mercury arc radiation.

Efficiency of the process of this invention is improved when radiant energy consisting essentially of wavelengths of 3000 to 4000 angstrom units is used. Filters can be used to remove radiant energy having wavelengths shorter than 3000 angstrom units, or low pressure phosphor coated mercury arc lamps which produce radiant energy consisting essentially of wavelengths of 3000 to 4000 angstrom units can be used.

Exposure reactions of the process of this invention can be conducted at temperatures ranging from the melting point to the boiling point of the mixture of the reactants which includes temperatures below about −10° C. and up to about 80° C. A batch process is usually used to carry out the reactions of this invention, but a continuous type process can also be used. The process of this invention can be carried out in the presence of air, but improved yields are obtained when the exposure reaction is carried out under an inert gas such as nitrogen or argon.

Typical (A) compounds useful in the process of this invention are benzene, toluene, ortho, meta, and para-xylene, catechol, resorcinol, hydroquinone, biphenyl, chloro-benzene, fluoro-benzene, methoxy-benzene, dimethyl-aminobenzene, chloro-toluene, fluoro-toluene, ethyl benzene, propyl benzene, butyl benzene, secondary-butyl benzene, tertiary-butyl benzene, pentyl benzene, octyl benzene, decyl benzene, dimethyl benzene, methylethyl benzene, diethyl benzene, methyl-propyl benzene, methyl-butyl benzene, methyl-pentyl benzene, etc. The rate of the sunlight exposure reactions of this invention increases as the number and length of substituted groups on the benzene ring decreases.

The term "photosensitizer" is used in this specification to describe compounds which absorb radiation to obtain a higher energy level and become excited and then transfer this energy to reactants taking part in a reaction, in accordance with principles of photochemistry. The term "aromatic" is used to describe compounds useful as photosensitizers for the reactions of this invention and which have a ring possessing resonance. Typical photosensitizers useful in the process of this invention include aromatic aldehydes such as benzaldehyde, and acetophenone as well as the more efficient diaryl ketones having the structural formula

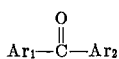

in which both $Ar_1$ and $Ar_2$ are aromatic radicals. Preferred diaryl ketones, because of improved reaction rates, are benzophenone, chlorobenzophenone, dichlorobenzophenone, alkyl benzophenones such as methyl benzophenone, ethyl benzophenone, etc.; dialkyl benzophenones such as dimethyl benzophenone, diethylbenzophenone, etc.; hydroxybenzophenone; alkoxybenzophenones such as methoxybenzophenone, etc.; dihydroxybenzophenone; dialkoxybenzophenones such as dimethoxybenzophenone, etc.; and fluorenone. Best reaction rates are obtained when benzophenone is used as the photosensitizer.

A minute quantity of photosensitizer is sufficient to promote the reaction of this invention. Reaction rate increases with increasing amounts of photosensitizer, reaching a maximum when there are enough photosensitizer molecules to accomodate all photons in the radiant energy. For most radiant energy sources, including sunlight, photosensitizer quantities of about 0.1% to 4% by weight based on total weight of (A) compound produce good reaction rates.

An excess of at least about 10% by weight over stoichiometric weight of (A) compound is usually used in the process of this invention. This excess serves as a solvent for maleic anhydride and photosensitizer and as a reaction medium. The stoichiometric weight of (A) compound is based on theoretical addition of two moles of maleic anhydride to one mole of (A) compound. Additional solvents such as cyclohexane or aliphatic ketones such as acetone can be added if desired, but recovery of unused reactants is complicated by the presence of additional solvents.

During the radiation exposure reaction of this invention, two addition reactions apparently take place at the double bond carbon atoms of the maleic anhydride structure. First, a mole of maleic anhydride adds to adjacent ring carbon atoms of the (A) compound, followed by a second addition of a mole of maleic anhydride to (A) compound ring carbon atoms para to each other and ortho to a ring carbon atoms of the first addition. When substituted ring compounds are used as the (A) compounds of this invention, this first addition reaction takes place at a sterically open site, for example, initial addition to biphenyl is at the 3,4 position,

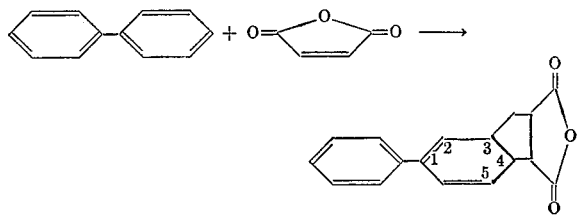

and initial addition to hydroquinone is at the 2,3 position,

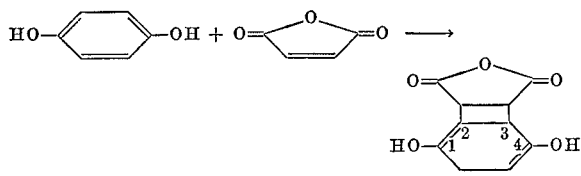

The second addition of maleic anhydride to these compounds is to the 2,5 carbons of the biphenyl compound and to the 1,4 carbons of the hydroquinone compound.

Exposure to summer sunlight within about 26 to 52 degrees of north latitude for about 10 to 14 days is sufficient to complete the exposure reaction of this invention when benzene is the (A) compound, benzophenone is the photosensitizer, and there is at least a 10% excess of benzene. The radiant energy level of this sunlight has been determined in several studies, for example, see Hirt, Schmitt, Searle, and Sullivan, Ultraviolet Spectral Energy Distribution of Natural Sunlight and Accelerated Test Light Sources, Journal of the Optical Society of America, 50:706(1960). Use of radiant energy sources having higher energy levels (e.g., sunlight at lower latitudes) along with the proper amount of photosensitizer decreases this time period, while the use of substituted benzene as the (A) compound, a less efficient photosensitizer or lower energy levels of radiant energy (e.g., sunlight at higher latitudes), increase the time period.

Separation of the solid dianhydride compounds resulting from the radiation exposure reaction of this invention can be accomplished by filtration, centrifuging followed by decanting the supernatant liquid, evaporation, etc. The dianhydrides resulting from the process of this invention are pure and are useful in forming the corresponding tetracarboxylic acids which can be reacted with diols to form the corresponding esters, or can be reacted with diamines to form polyimides useful as coating compositions. The dianhydrides are also useful as crosslinking agents.

The following examples further illustrate the process of this invention.

EXAMPLE I

A solution of maleic anhydride (14 g.) and benzophenone (2.8 g.) in benzene (265 ml.) is placed in a stoppered borosilicate glass tube having a surface area of 800 sq. cm., leaving about 10 ml. of air above the reactants. The solution is exposed to June sunlight at Reading, Berkshire, England (51–52° north latitude) for 14 days (78 hr. of direct sunlight as measured with a Campbell-Stokes Recorder), shaking gently, from time to time, to dislodge the product from the walls of the tube. Filtration of the reaction product mixture gave tricyclo-$[4,2,2,O^{2,5}]$-7 decene - 3,4,9,10 - tetracarboxylic dianhydride (18.2 g., 93% yield) as a colorless solid. The dianhydride is pure as shown by comparison of its melting point, mixed melting point and infra red spectrum with a sample of known purity.

EXAMPLE II

Maleic anhydride (27.2 grams) and benzophenone (6 grams) are dissolved in about 500 milliliters of toluene. This solution is sealed under nitrogen into a bag made of polyvinylfluoride film and exposed to August sunlight at Philadelphia, Pennsylvania (40° north latitude) for 10 days. The reaction product mixture is filtered and the solid washed with acetone. About 5.5 grams of pure tricyclo $[4,2,2,O^{2,5}]$ - 7 - methyl - 7 - decene - 3,4,9,10 - tetracarboxylic dianhydride results.

EXAMPLE III

About 74.7 grams of maleic anhydride and 9.1 grams of benzophenone are dissolved in about 500 milliliters of benzene. Equal portions of this solution are poured into each of four borosilicate glass cylinders and exposed to radiant energy consisting essentially of wavelengths of about 3000 to 4000 Angstrom units produced by 16 low pressure phosphor coated mercury arc lamps in a Rayonet Photochemical Chamber Reactor for 48 hours. The solid product is removed by filtration and washed with benzene. About 70.8 grams of pure tricyclo $[4,2,2,O^{2,5}]$-7-decene-3,4,9,10-tetracarboxylic dianhydride is formed.

What is claimed is:
1. A process for producing a tricyclic tetracarboxylic dianhydride having the structural formula

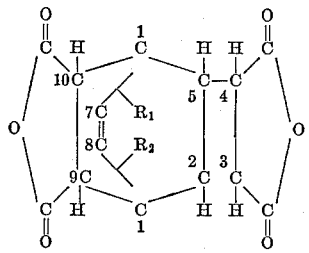

in which $R_1$ and $R_2$ are attached to different carbon atoms in the group numbered 1, 8, 7, 6; $R_1$ is selected from the group consisting of hydrogen, chloro, fluoro, dimethylamino, diethylamino, methylethylamino, alkyl, alkoxy, and hydroxyl; $R_2$ is selected from the group consisting of chloro, fluoro, phenyl, alkyl, alkoxy and hydroxyl, $R_2$ being hydroxyl when $R_1$ is hydroxyl; $R_2$ is attached to one of the carbon atoms numbered 7 and 8 when $R_1$ is hydrogen and to one of the carbon atoms numbered 1, 8, 7, 6 when $R_1$ is other than hydrogen; the remaining unsatisfied valences of the carbon atoms numbered 1, 8, 7, 6 being satisfied by hydrogen; said process comprising
(1) exposing to radiant energy consisting essentially of wavelengths of about 2700 to 4000 Angstrom units, a solution consisting essentially of
    (A) a compound having the structural formula

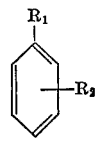

in which $R_1$ and $R_2$ are the same as $R_1$ and $R_2$ of the dianhydride,
    (B) maleic anhydride, and
    (C) a photosensitizer consisting essentially of an aromatic compound having a carbonyl group attached to the ring, and
(2) separating the resulting dianhydride from the reaction product mixture.

2. The process of claim 1 in which the photosensitizer is a diaryl ketone having the structural formula

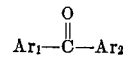

in which both $Ar_1$ and $Ar_2$ are aromatic radicals.

3. The process of claim 2 in which the photosensitizer is from the group consisting of benzophenone, chlorobenzophenone, dichlorobenzophenone, alkylbenzophenone, dialkylbenzophenone, hydroxybenzophenone, alkoxybenzophenone, dihydroxybenzophenone, dialkoxybenzophenone, and fluorenone.

4. The process of claim 3 in which the photosensitizer is benzophenone.

5. The process of claim 4 in which $R_1$ of the (A) compound is hydrogen.

6. The process of claim 5 in which the quantity of (A) compound is at least a 10% excess by weight over the stoichiometric weight of (A) compound.

7. The process of claim 6 in which the quantity of sensitizer is about 0.1% to 4% by weight based on total weight of (A) compound.

8. The process of claim 7 in which the exposure step is carried out under an inert gas.

9. The process of claim 8 in which the radiant energy consists essentially of wavelengths of 3000 to 4000 Angstrom units.

10. The process of claim 1 in which the quantity of sensitizer is about 0.1% to 4% by weight based on the total weight of (A) compound.

11. The process of claim 1 in which the exposure step is carried out under an inert gas.

12. The process of claim 1 in which the radiant energy consists essentially of wavelengths of 3000 to 4000 Angstrom units.

13. The process of claim 1 in which the quantity of (A) compound is at least a 10% excess by weight over the stoichiometric weight of (A) compound.

References Cited

UNITED STATES PATENTS 3,257,418   6/1966   Vermont _____ 204—158 X

OTHER REFERENCES

Journal Chemical Society (1962) pp. 2675–2679.
Tetrahedron Letters, No. 21 (1960) pp. 1, 4 and 5.

HOWARD S. WILLIAMS, Primary Examiner

U.S. Cl. X.R.

204—162

UNITED STATES PATENT OFFICE
CERTIFICATE OF CORRECTION

Patent No. 3,480,532          Dated November 25, 1969

Inventor(s) Derek Bryce-Smith, Andrew Gilbert & Brian Vickery

It is certified that error appears in the above-identified patent and that said Letters Patent are hereby corrected as shown below:

Column 5, first structural formula in claim 1, that portion of the formula reading

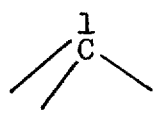   should read   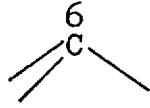

and that portion of the formula reading

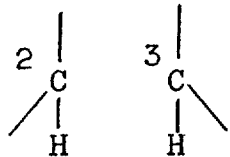   should read   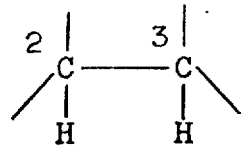

SIGNED AND SEALED

MAR 10 1970

(SEAL)
Attest:

Edward M. Fletcher, Jr.
Attesting Officer

WILLIAM E. SCHUYLER, JR.
Commissioner of Patents